JOHN P. HAINES.
Improvement in Oil-Cups.
No. 4,361. Reissued May 2, 1871.
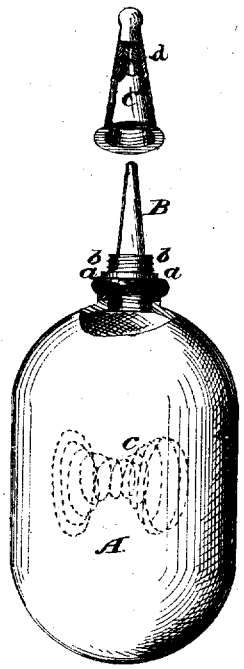
WITNESSES:
P. C. Dieterich.
Wm. H. C. Smith.
INVENTOR
J. P. Haines.
per: Munn & Co
ATTORNEYS.
AM. PHOTO-LITHOGRAPHIC CO. N.Y. (OSBORNE'S PROCESS.)

UNITED STATES PATENT OFFICE.

JOHN PETER HAINES, OF NEW YORK, N. Y.

IMPROVEMENT IN OIL-CUPS.

Specification forming part of Letters Patent No. 92,820, dated July 20, 1869; Reissue No. 4,361, dated May 2, 1871.

*To all whom it may concern:*

Be it known that I, JOHN PETER HAINES, of the city of New York, in the county and State of New York, have invented a new and Improved Pocket Oil-Can; and I do hereby declare that the following is a full, clear, and exact description thereof, which will enable others skilled in the art to make and use the same, reference being had to the accompanying drawing, forming part of this specification.

The drawing represents a perspective view, partly in section, of my improved oil-can.

My invention relates to oil-cans intended to be carried about in the pocket, and, consequently, liable to assume various positions.

My invention consists, first, in an article made up of three parts never before combined in an oil-can.

It consists, secondly, in a peculiar construction of the body to render it smooth, pliable, and not irksome to the person of the party carrying it.

A in the drawing represents the body of my improved oil-can; B, the nozzle, and C the cap, of the same. The body A is made of one or more pieces of sheet metal, and is of oval or spherical form, or otherwise rounded, so as not to present any sharp corners or edges. The shank *a* of the nozzle has a screw-thread to fit the mouth of the body, in which a corresponding female screw-thread is provided. The shank is also provided with a screw-thread, *b*, to receive the cap C, in which a corresponding female screw-thread is provided. Thus, when the cap is put on, the end of the nozzle will be protected, so that no oil can drop out of the can. As a further security the interior of the cap C is provided with a packing, *d*, of leather or other material, as shown.

A spring, *c*, may be arranged within the can to keep its spring-sides apart.

Having thus described my invention, I claim as new and desire to secure by Letters Patent—

1. As an article of manufacture, a pocket oil-can formed of a round body, A, nozzle B, and cap C, combined as described.

2. In an oil-can adapted to be carried in the pocket, a body, A, formed of thin elastic metal rounded into an oval form, and having its sides held apart by an inner spring, as specified.

JOHN PETER HAINES.

Witnesses:
ALEX. F. ROBERTS,
GEO. W. MABEE.